J. S. KING.
MEASURING DEVICE.
APPLICATION FILED MAY 8, 1912.
1,052,259.
Patented Feb. 4, 1913.
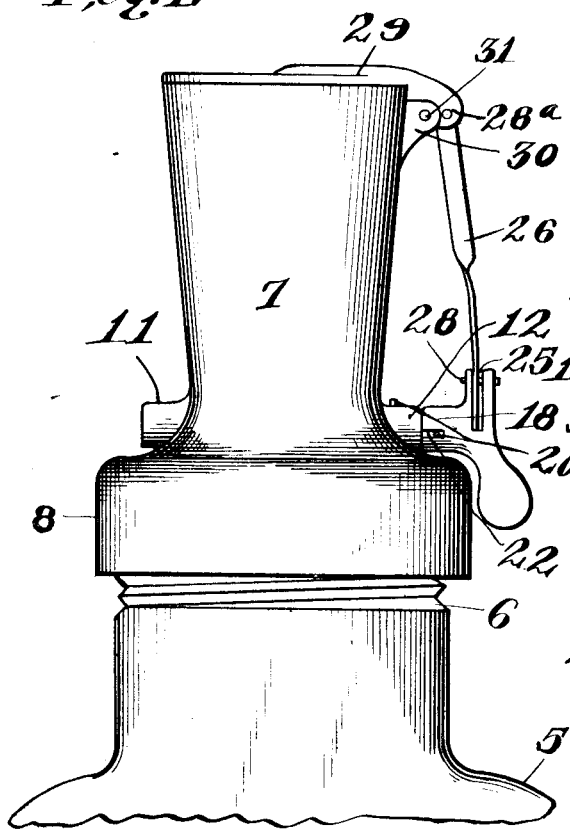
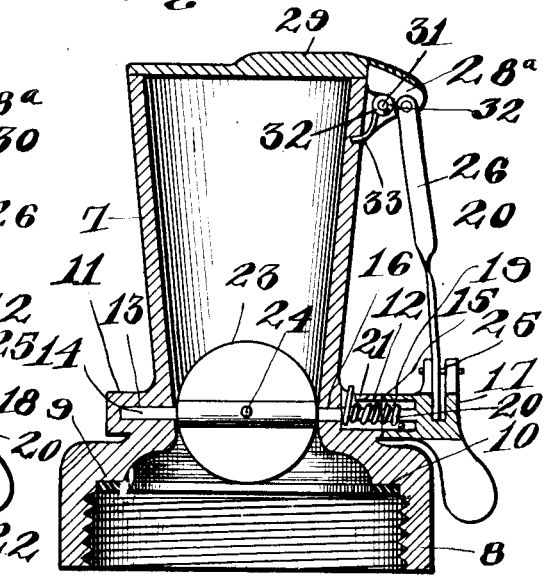
Witnesses
Rohe Meyer.
L. E. Barkley.
Inventor
Joseph King.
By Frank S. Ammerman
Attorney

UNITED STATES PATENT OFFICE.

JOSEPH S. KING, OF BALTIMORE, MARYLAND, ASSIGNOR OF ONE-HALF TO WILLIAM A. MATTHEWS, OF BALTIMORE, MARYLAND.

MEASURING DEVICE.

1,052,259. Specification of Letters Patent. Patented Feb. 4, 1913.

Application filed May 8, 1912. Serial No. 696,044.

*To all whom it may concern:*

Be it known that I, JOSEPH S. KING, a citizen of the United States of America, and resident of the city of Baltimore, in the State of Maryland, have invented certain new and useful Improvements in Measuring Devices, of which the following is a specification.

This invention relates to dispensing devices and particularly to an attachment for a container, the said dispensing device having novel means for delivering a predetermined amount of material at each cycle of operation of the said device, means being provided for tightly sealing or closing the discharge end of the dispensing device, in order to prevent deterioration of the contents of the container, or the access of impurities thereto.

A still further object of this invention is to provide a dispensing device for a container, here shown as a bottle having a threaded neck, the said dispensing device having means for closing communication between the container and a measuring chamber of the dispensing device prior to the opening of the discharge end of the said dispensing device, novel means being provided for returning the parts to normal positions for a repetition of the operation.

With the foregoing and other objects in view, the invention consists in details of construction and in the arrangement and combination of parts to be hereinafter more fully set forth and claimed.

In describing the invention in detail, reference will be had to the accompanying drawing forming part of the specification, wherein like characters denote corresponding parts in the several views, and in which—

Figure 1 is a view in elevation of a fragment of a container with a dispensing device, embodying the invention applied thereto. Fig. 2 is a vertical sectional view on the line 2—2 of Fig. 3. Fig. 3 is a view in elevation of the dispensing device at a position at right angles to the view of the dispensing device shown in Fig. 1.

In these drawings, 5 denotes a fragment of a bottle having a threaded neck 6, to which the dispensing device is applied. The dispensing device has a spout or chute 7, formed integral with an annular flange 8, which flange is internally threaded to engage the threads on the neck of a bottle, and there being a shoulder 9 at the junction of the flange and spout forming a seat for a gasket 10. At a point approximately the junction of the spout and flange, there are bosses 11 and 12, the former of which is provided with a recess 13, extending from the inner wall of the spout inwardly, forming a seat for the reception of the shaft 14, and in which said shaft is rotatable. The boss 12 is provided with a recess 15 through which the shaft 14 projects, the said shaft also projecting through an aperture 16 formed in the wall of the spout 7. An operating lever or handle 17 is formed integral with the shaft 14, the said lever 17 having a boss 18 which is channeled around the shaft to form a seat 19 designed to receive a spring 20, which spring encircles the shaft 14. The boss 12 has an aperture 21, through which one end of the spring projects, or in which said spring is anchored, whereas the boss 18 has an aperture 22 through which the opposite end of the spring projects so that as the lever 17 is partially rotated, the end of the spring projecting through the aperture 22, is moved, and as the opposite end of said spring is anchored in the boss 12, a winding action of the spring results which increases the tension of the spring, the action of the spring on the release of the lever 17 being such as to return the lever and shaft to their normal positions. The shaft 14 has a disk valve 23 mounted on it and secured to it by the fastening device 24, which fastening device may be in the form of a pin or screw, the said valve serving to guard the passage between the container and the spout when the device is applied to the said container. A lever 17 has a bifurcation 25 at its end in which the end of the link 26 is placed, the said link having a slot 27, designed to receive a pin 28 extending transversely of the bifurcated portion of the said lever, so that the said pin being carried by the lever, travels in the slot 27 until the end of the slot is reached, when further movement of the lever communicates motion to the link. The end of the link remote from the lever, is pivoted to a lug 28ª formed on the cover 29, which engages the end of the spout and serves to close the same. The lug 28ª is arranged between the ears 30, formed integral with the spout, and is mounted on said ears through the medium of the pivot 31. A spring 32 encircles the pivot 31 between the ears, and one end of the spring is anchored to the outer surface of the spout as shown at 33, whereas the other end of the said spring bears against the rear inner surface of the lug 28ª, as shown at 34, the said spring having an action or tendency to force the outer end of the lug upwardly, thereby holding the lid or cover 29 on the end of the spout.

From an inspection of the drawing, and a consideration of the foregoing description, it will be apparent that it is the purpose of the inventor to have the valve 23 and the cover 29 operated in sequence, the purpose being to have the valve 23 in position to close the passage between the container and the spout, prior to the actuation of the mechanism which removes the lid, or the cover, from the end of the spout. To that end, actuation of the end of the lever in the direction of the arrow 35 in Fig. 3, will result in partially rotating the valve 23 to a position approximately at right angles to that at which it is shown as occupying in Fig. 2, prior to the engagement of the pin 28 with the end wall of the slot 27, and upon further movement of the lever 27, after the engagement of the pin 28 with the end of the slot 27, movement will be imparted to the link, and therefore to the cover to unguard the end of the spout, and to discharge the contents of the spout. A reversal of the operation will naturally result in seating the cover 29 on the end of the spout, prior to movement of the valve 23, sufficient to unguard the passage between the container and the spout. After the cover has become seated, however, the lever moves independently of the link, and while doing so, the shaft is partially rotated, and the valve 23 is returned to the position it is shown to occupy in Fig. 2. The cover 29 is independently spring-held in a closed position, and the shaft 14 is independently rotated to return to its normal position, after the lever is released by the operator.

I claim:—

In a dispensing device, a spout having means for attachment with a container, a shaft journaled in the spout near the inner end thereof, a hollow boss externally of the spout through which boss the shaft projects, a lever for the shaft, a channeled boss on the lever through which the shaft extends, a spring encircling the shaft and within the bosses and having one end anchored to each boss, a link having a slot near one end, means for connecting the lever to the link, said means for connecting lying in the slot of the link, whereby the lever may move partially independently of the link, and move the link after the lever has traveled a predetermined distance, a closure for the end of the spout, means for connecting the link to the closure, means for holding the closure normally seated on the spout, and a valve on the shaft in position to open the spout when the closure is seated, and movable to close the spout when the closure is unseated.

In testimony whereof, I hereunto affix my signature in the presence of two witnesses.

J. S. KING.

Witnesses:
W. F. McAvoy,
Jas. Oscar Preston.